US012713183B2

(12) United States Patent
Bruni et al.

(10) Patent No.: US 12,713,183 B2
(45) Date of Patent: Aug. 18, 2026

(54) ESTIMATION OF AUDIO DEVICE AND SOUND SOURCE LOCATIONS

(71) Applicant: DOLBY LABORATORIES LICENSING CORPORATION, San Francisco, CA (US)

(72) Inventors: Avery Bruni, San Francisco, CA (US); Mark R. P. Thomas, Walnut Creek, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 154 days.

(21) Appl. No.: 18/708,735

(22) PCT Filed: Nov. 7, 2022

(86) PCT No.: PCT/US2022/049174
§ 371 (c)(1),
(2) Date: May 9, 2024

(87) PCT Pub. No.: WO2023/086304
PCT Pub. Date: May 19, 2023

(65) Prior Publication Data
US 2025/0008262 A1 Jan. 2, 2025

Related U.S. Application Data

(60) Provisional application No. 63/277,200, filed on Nov. 9, 2021.

(51) Int. Cl.
*H04R 3/00* (2006.01)
*H04R 1/40* (2006.01)
(Continued)

(52) U.S. Cl.
CPC ............ *H04R 3/005* (2013.01); *H04R 1/403* (2013.01); *H04R 1/406* (2013.01); *H04R 3/12* (2013.01); *H04R 29/002* (2013.01)

(58) Field of Classification Search
CPC ........ H04R 3/005; H04R 1/403; H04R 1/406; H04R 3/12; H04R 29/002;
(Continued)

(56) References Cited

U.S. PATENT DOCUMENTS

| | | | |
|---|---|---|---|
| 7,130,705 | B2 | 10/2006 | Amir |
| 8,811,119 | B2 | 8/2014 | Aarts |

(Continued)

FOREIGN PATENT DOCUMENTS

| | | | |
|---|---|---|---|
| WO | 2017039632 | A1 | 3/2017 |
| WO | 2020060903 | A1 | 3/2020 |

(Continued)

OTHER PUBLICATIONS

C. Franco, et al., "iBalance-ABF: A Smartphone-Based Audio-Biofeedback Balance System", IEEE Transactions on Biomedical Engineering, vol. 60, No. 1, Jan. 2013, pp. 211-215, 5 Pages.

(Continued)

*Primary Examiner* — Xu Mei

(57) ABSTRACT

Some disclosed methods involve receiving, by a control system, location control data from a sound source as the sound source emits sound in a plurality of sound source locations within an audio environment. Some such methods involve receiving, by the control system, direction of arrival data from each audio device of a plurality of audio devices in the audio environment. In some examples, each audio device of the plurality of audio devices includes a microphone array and the direction of arrival data corresponding to microphone signals from microphone arrays responsive to sound emitted by the sound source in the plurality of sound
(Continued)

source locations. Some such methods involve estimating, by the control system, sound source locations and audio device locations based, at least in part, on the location control data and the direction of arrival data.

25 Claims, 12 Drawing Sheets

(51) Int. Cl.
*H04R 3/12* (2006.01)
*H04R 29/00* (2006.01)

(58) Field of Classification Search
CPC ........ H04R 2201/405; H04R 2205/024; H04R 1/26; H04R 29/005; H04R 5/02; H04S 7/30
See application file for complete search history.

(56) References Cited

U.S. PATENT DOCUMENTS

| | | | | |
|---|---|---|---|---|
| 9,316,717 | B2 * | 4/2016 | Gicklhorn | G01S 5/18 |
| 9,549,253 | B2 * | 1/2017 | Alexandridis | H04R 3/005 |
| 9,743,212 | B2 | 8/2017 | Ridihalgh | |
| 10,042,038 | B1 * | 8/2018 | Lord | G10L 25/51 |
| 10,291,986 | B1 | 5/2019 | Plitkins | |
| 10,779,084 | B2 * | 9/2020 | Arteaga | H04R 3/005 |
| 10,848,891 | B2 | 11/2020 | Khaleghimeybodi | |
| 10,904,687 | B1 | 1/2021 | Prospero | |
| 10,957,299 | B2 | 3/2021 | Tourbabin | |
| 10,979,838 | B2 | 4/2021 | Donley | |
| 11,070,912 | B2 | 7/2021 | Mehra | |
| 11,070,932 | B1 | 7/2021 | Prospero | |
| 11,277,706 | B2 | 3/2022 | Milne | |
| 11,375,178 | B2 | 6/2022 | Lakshman | |
| 11,381,913 | B2 | 7/2022 | Forrester | |
| 11,849,104 | B2 | 12/2023 | Lakshman | |
| 12,075,210 | B2 * | 8/2024 | Lepoutre | G01S 3/805 |
| 12,356,146 | B2 * | 7/2025 | Radisavljevic | H04R 1/406 |
| 2015/0016642 | A1 | 1/2015 | Walsh | |
| 2018/0249267 | A1 * | 8/2018 | Klingler | H04R 29/005 |
| 2018/0376268 | A1 | 12/2018 | Kerdranvat | |
| 2021/0304777 | A1 | 9/2021 | Kim | |
| 2021/0385602 | A1 | 12/2021 | Po | |
| 2022/0038836 | A1 | 2/2022 | Carlsson | |
| 2022/0046373 | A1 | 2/2022 | Hartung | |
| 2022/0156584 | A1 | 5/2022 | Fersch | |
| 2022/0159404 | A1 | 5/2022 | Stringer | |
| 2023/0040846 | A1 * | 2/2023 | Thomas | H04R 3/005 |
| 2024/0022869 | A1 | 1/2024 | Arteaga | |

FOREIGN PATENT DOCUMENTS

| | | | |
|---|---|---|---|
| WO | 2021127286 | A1 | 6/2021 |
| WO | 2022118072 | A1 | 6/2022 |
| WO | 2024102654 | A1 | 5/2024 |

OTHER PUBLICATIONS

Eric A. Wan, et al. "The Unscented Kalman Filter for Nonlinear Estimation", Proceedings of the IEEE 2000 Adaptive Systems for Signal Processing, Communications, and Control Symposium, Oct. 4, 2000, 6 Pages.

Francombe, et al., "Media Device Orchestration for Immersive Spatial Audio Reproduction", Proceedings of the 12th International Audio Mostly Conference on Augmented and Participatory Sound and Music Experiences, Aug. 2017, 5 Pages.

G. F. Welch, "History: The use of the kalman filter for human motion tracking in virtual reality", Published in: Presence, vol. 18, No. 1, doi: 10.1162/pres.18.1.72, Feb. 1, 2009, pp. 72-91, 20 pages.

Hyosu Kim, et al. "Mobile maestro: enabling immersive multi-speaker audio applications on commodity mobile devices", Proceedings of the 2014 ACM International Joint Conference on Pervasive and Ubiquitous Computing, Sep. 13-17, 2014, 12 Pages.

Michael Montemerlo, "FastSLAM: A Factored Solution to the Simultaneous Localization and Mapping Problem with Unknown Data Association", The Robotics Institute Carnegie Mellon University Pittsburgh, PA 15213, CMU-RI-TR-03-28, Jul. 11, 2003, 129 Pages.

Simon Michaud et al: "3D Localization of a Sound Source Using Mobile Microphone Arrays Referenced by SLAM", arxiv.org, Cornell University Library, 201 Olin Library Cornell University Ithaca, NY 14853, Jul. 21, 2020, 6 Pages.

Southwell, et al. "A Mobile Phone Based Device Mapping Algorithm for Output-Only Devices using DSSS Signals", Report, Aug. 23, 2022, 08 Pages.

* cited by examiner

ESTIMATION OF AUDIO DEVICE AND SOUND SOURCE LOCATIONS

CROSS-REFERENCE TO RELATED APPLICATION

This application is a National Phase entry of PCT Patent Application No. PCT/US22/49174, filed Nov.7, 2022, which claims priority of the following priority applications: U.S. provisional application 63/277,200, filed 9 Nov. 2021, which is incorporated by reference in its entirety.

TECHNICAL FIELD

This disclosure pertains to systems and methods for automatically locating audio devices and sound source locations.

BACKGROUND

Audio devices, including but not limited to smart audio devices, have been widely deployed and are becoming common features of many homes. Although existing systems and methods for locating audio devices provide benefits, improved systems and methods would be desirable.

NOTATION AND NOMENCLATURE

Throughout this disclosure, including in the claims, the terms "speaker," "loudspeaker" and "audio reproduction transducer" are used synonymously to denote any sound-emitting transducer (or set of transducers). A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is an audio device that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

As used herein, the terms "program stream" and "content stream" refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via methods. Some such methods may involve estimating locations in an audio environment. Some such methods may involve receiving, by a control system, location control data from a sound source as the sound source emits sound in a plurality of sound source locations within the audio environment. In some examples, the location control data may be, or may include, inertial sensor data.

Some methods may involve receiving, by the control system, direction of arrival data from each audio device of a plurality of audio devices in the audio environment. In some examples, each audio device of the plurality of audio devices may include a microphone array. According to some examples, the direction of arrival data may correspond to microphone signals from microphone arrays responsive to sound emitted by the sound source in the plurality of sound source locations. Some methods may involve estimating, by the control system, sound source locations and audio device locations based, at least in part, on the location control data and the direction of arrival data.

Some methods may involve controlling one or more aspects of audio processing for audio data played back by one or more audio devices of the plurality of audio devices based, at least in part, on the audio device locations. The one or more aspects of audio processing may, for example, include rendering the audio data for playback, acoustic echo cancellation or a combination thereof.

Some methods may involve receiving, by the control system, audio level data from one or more audio devices of the plurality of audio devices. In some examples, the audio level data may correspond to the sound emitted by the sound source in the plurality of sound source locations. Some such methods may involve estimating, by the control system, one or more audio device orientations based, at least in part, on the audio level data. Some methods may involve estimating, by the control system, an acoustic decay critical distance based, at least in part, on the audio level data.

Some methods may involve providing, by the control system, sound source location instructions for the sound source. In some examples, providing the sound source location instructions may involve providing one or more user prompts for a user of the sound source. In some examples, the user prompts may include audio prompts, visual prompts, haptic feedback prompts, or a combination thereof. In some examples, the user prompts may include visual prompts via one or more graphical user interfaces. According to some examples, the sound source may be an automated mobile sound source. Providing the sound source location instructions may involve providing control signals to the automated mobile sound source.

According to some examples, estimating the sound source locations and the audio device locations may involve making a prediction of a state of a system that includes the sound source and the plurality of audio devices, comparing the prediction with an observation of the system and correcting the prediction based, at least in part, on the observation. In some examples, the method may involve determining a weight for correcting the prediction based, at least in part, on the observation.

In some examples, estimating the sound source locations and the audio device locations may involve implementing, by the control system, a Kalman filter. In some such examples, the Kalman filter may be an extended Kalman filter or an Unscented Kalman filter.

In some examples, a process of estimating the sound source locations and audio device locations may occur during a time interval in which location control data and direction of arrival data are being obtained. According to some examples, a process of estimating the sound source locations and audio device locations may begin after a time interval in which location control data and direction of arrival data have been obtained.

According to some examples, the estimating may involve a recursive process. In some examples, estimating the sound source locations and the audio device locations may involve a non-causal process. In some such examples, estimating the sound source locations and the audio device locations may involve implementing, by the control system, a Maximum Likelihood solver.

According to some examples, the method may involve estimating, by the control system, one or more sound source kinematic properties based, at least in part, on the location control data. The sound source kinematic properties may, for example, include velocity, acceleration, or both.

In some examples, estimating the sound source locations and audio device locations may involve making a first estimation based on first location control data and first direction of arrival data obtained during a first time interval.

In some such examples, the first time interval may correspond to an initial audio device setup.

In some examples, estimating the sound source locations and audio device locations may involve making a second estimation based on second location control data and second direction of arrival data obtained during a second time interval. According to some examples, the second time interval may correspond to a time subsequent to an initial audio device setup time. In some examples, the second time interval may correspond to a "run time" during which an audio system is in operation. According to some examples, the second direction of arrival data may correspond to microphone signals responsive to human speech, such as human speech in the audio environment. Some examples may involve using estimated audio device locations from the first estimation as inputs for making the second estimation.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

At least some aspects of the present disclosure may be implemented via apparatus. For example, one or more devices may be capable of performing, at least in part, the methods disclosed herein. In some implementations, an apparatus may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In some examples, the apparatus may be one of the audio devices disclosed herein. However, in some implementations the apparatus may be another type of device, such as a mobile device, a laptop, a server, etc.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
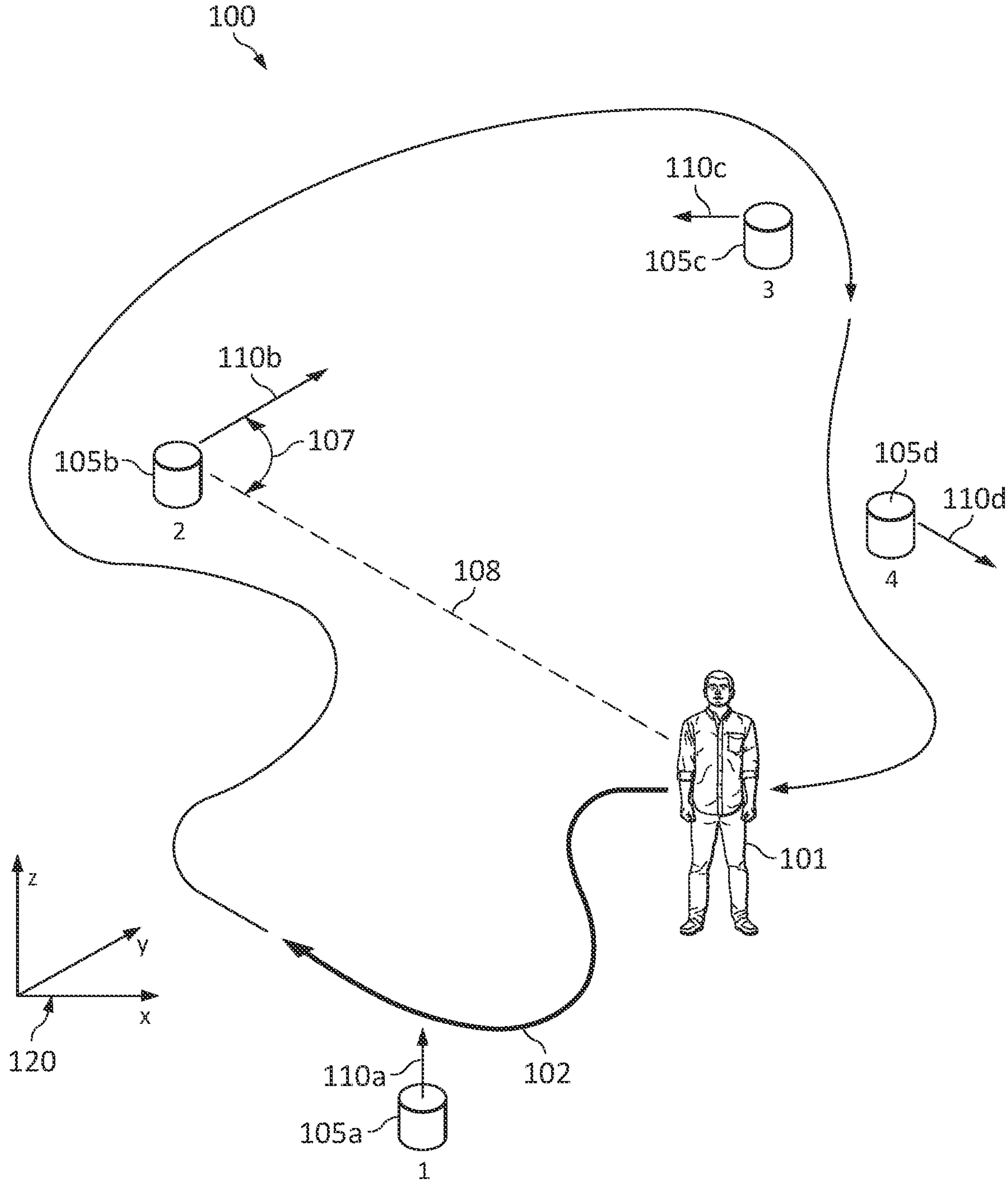
FIG. 1 represents one example of a sound source moving between various locations of an audio environment.

The advent of smart speakers, which incorporate multiple drive units and microphone arrays, in addition to existing audio devices including televisions and sound bars, and new microphone and loudspeaker-enabled connected devices such as lightbulbs and microwaves, creates a context in which dozens of microphones and loudspeakers may need locating relative to one another, for example, in order to achieve audio device orchestration. Audio devices cannot be assumed to lie in canonical layouts (such as a discrete Dolby 5.1 loudspeaker layout). In some instances, the audio devices in an audio environment may be randomly located, or at least may be distributed within the audio environment in an irregular and/or asymmetric manner. The audio environment may be, or may include, one or more rooms or other areas (such as patio or Arizona room areas) of a home, one or more rooms of an office or other commercial establishment, an outdoor environment, etc., depending on the particular implementation.

Audio devices cannot be assumed to be homogeneous or synchronous. As used herein, audio devices may be referred to as "synchronous" or "synchronized" if sounds are detected by, or emitted by, the audio devices according to the same sample clock, or synchronized sample clocks. For example, a first synchronized microphone of a first audio device within an environment may digitally sample audio data according to a first sample clock and a second microphone of a second synchronized audio device within the environment may digitally sample audio data according to the first sample clock. Alternatively, or additionally, a first synchronized speaker of a first audio device within an environment may emit sound according to a speaker set-up clock and a second synchronized speaker of a second audio device within the environment may emit sound according to the speaker set-up clock.

Some previously-disclosed methods for automatic speaker location require synchronized microphones, loudspeakers, or combinations thereof. For example, some previously-existing tools for device localization rely upon sample synchrony between all microphones in the system, requiring known test stimuli and passing full-bandwidth audio data between sensors (such as microphones).

The present assignee has produced several speaker localization techniques for cinema and home that are excellent solutions in the use cases for which they were designed. Some such methods are based on time-of-flight derived from impulse responses between a sound source and microphone (s) that are approximately co-located with each loudspeaker. While system latencies in the record and playback chains may also be estimated, sample synchrony between clocks is required in some such previously-disclosed implementations, along with the need for a known test stimulus from which to estimate impulse responses. In some prior implementations, audio device locations are based on direction of arrival (DOA), time of arrival (TOA), or impulse responses (IRs).

Various previously-disclosed implementations are subject to errors from effects such as echoes, reverberation, acoustic occlusions, interference, etc. Many of these problems can be ameliorated by calibrating with a moving sound source, because movement of the sound source can open up new direct arrival paths that avoid occlusions, change direct-to-reverberation ratios, and improve SNR. Moreover, using multiple observations over time from a moving sound source can increase statistical confidence in the resulting estimations of audio device locations, sound source locations, sound source velocities, measured attributes of the audio environment, etc.

Accordingly, various disclosed implementations involve moving sound sources. Some of the examples disclosed herein are configured for the automatic estimation of sound source locations and audio device locations based, at least in part, on location control data from a moving sound source and DOA data corresponding to the moving sound source as the sound source emits sound in multiple sound source locations within an audio environment. In some examples, DOA data may be received from various audio devices in the audio environment. Each of the audio devices from which DOA data is received may include a microphone array. The DOA data may correspond to microphone signals responsive to sound emitted by the sound source in the sound source locations. Some examples involve obtaining sound source level data and estimating audio device orientations based, at least in part, on the sound source level data. Some examples involve estimating one or more sound source kinematic properties (such as velocity, acceleration, etc.) based, at least in part, on the location control data. Some examples involve estimating one or more acoustic properties of the audio environment, such as the acoustic decay critical distance.

According to some examples, one or more aspects of audio processing for audio device playback may be based, at least in part, on the estimated audio device locations, the estimated audio device orientations, the one or more estimated acoustic decay properties of the audio environment, or combinations thereof. The one or more aspects of audio processing may, for example, include acoustic echo cancellation, rendering the audio data for playback, or combinations thereof.

FIG. 1 represents one example of a sound source moving between various locations of an audio environment. In this example, the sound source is a person, also referred to herein as "user 101." According to this example, the sound source moves within the audio environment 100 along a sound source path 102. In this example, the audio environment 100 includes audio devices 105*a*, 105*b*, 105*c* and 105*d*.

In this example, each of the audio devices 105*a*-105*d* is a smart speaker that includes a loudspeaker system having one or more loudspeakers and a microphone system having a microphone array. In some examples, each microphone array may include three or more microphones, in order to facilitate DOA determination. In this example, the arrows 110*a*, 110*b*, 110*c* and 110*d* represent the orientations of the microphone arrays of each of the audio devices 105*a*-105*d*.

According to this example, the audio devices 105*a*-105*d* are in locations 1 through 4, respectively, of the audio environment 100. In this example, the line 108 represents the distance between location 2, corresponding to the audio device 105*b*, and the sound source at an instant in time represented by FIG. 1.

In this example, the arrows 110*a*-110*d* represent the orientations of a zero degree axis of the microphone arrays of each of the audio devices 105*a*-105*d*. The arrows 110*a*-110*d* may be thought of as corresponding to a direction in which each of the microphone arrays are facing, or a direction corresponding to line emanating from a centroid of each of the microphone arrays. Accordingly, the angle 107 is an angle between the line 108 and a zero degree axis of the microphone array of the audio device 105*b*. Therefore, the angle 107 indicates the DOA of sound from the sound source 101, according to the frame of reference of the audio device 105*b*, at the instant in time represented by FIG. 1. The orientations of the loudspeaker(s) of the audio devices 105*a*-105*d* may or may not be the same as the orientations of the corresponding microphone arrays, depending on the particular orientation. However, the relative positions and orientations of the loudspeaker(s) and the microphone arrays within of each of the audio devices 105*a*-105*d* are assumed to be known, for example based on specifications provided with each of the audio devices 105*a*-105*d*, based on inspections of the loudspeaker(s) and the microphone arrays of each of the audio devices 105*a*-105*d*, etc.

In this example, FIG. 1 shows an audio environment coordinate system 120 that corresponds to the audio environment 100 as a whole. In other examples, the audio environment coordinate system 120 may be expressed only in x,y coordinates. In yet other examples, the audio environment coordinate system 120 may be a cylindrical coordinate system, a spherical coordinate system, etc.

In some examples, the sound source may be the voice of the user 101. In other examples, the sound source may be a device that is carried around the audio environment 100 by the user 101. In some examples wherein the user 101 is causing the sound source to move within the audio environment 100, the user 101 may be provided with suggestions, prompts, instructions, etc., for moving around the audio environment 100. Some examples are described below.

As with other examples disclosed herein, the types, numbers, locations and orientations of elements shown in FIG. 1 are merely made by way of example. Other implementations may have different types, numbers and arrangements of elements, e.g., more or fewer audio devices, audio devices in different orientations, audio devices in different locations, audio devices having different capabilities, etc.

In some alternative implementations, the moving sound source may be, or may be carried by, a device that is configured for guided or unguided movement around the audio device 100, such as a robotic vacuum cleaner, a robotic servant, or another type of self-propelled device. The self-propelled device may or may not be configured to determine its own location, depending on the particular implementation. The self-propelled device may or may not be capable of autonomous movement, depending on the particular implementation.

According to some examples, a self-propelled device capable of autonomous movement that includes, or that is configured to carry, a sound-producing device may be provided with instructions, which in some instances may be implemented via software, for controlling the self-propelled device to move around the audio environment 100, to emit sound, etc. The instructions may, for example, include instructions for emitting one or more particular types of sound, such as sound including a particular range of frequencies, sound of a particular volume or "level," sound emitted during particular time intervals, etc. Alternatively, or additionally, the instructions may include instructions for moving along one or more paths in the audio environment 100, for example around furniture or other objects in the audio environment 100, around audio devices in the audio environment 100, etc. In some examples, the instructions may cause the self-propelled device, or a sound source transported by the self-propelled device, to emit sound from various locations relative to possible sound-absorbing objects, sound-reflecting objects, or combinations thereof, to emit sound from various locations relative to audio device locations, etc.

In some examples, a self-propelled device not capable of autonomous movement that includes, or that is configured to transport, a sound-producing device may be configured to receive, for example via an antenna system, signals from another device in the audio environment 100. The other device may, for example, be an audio device, a smart home hub, a remote control device operable by a person, etc. The signals may include instructions for moving around the audio environment 100, for emitting sound, etc.

Figure 2:
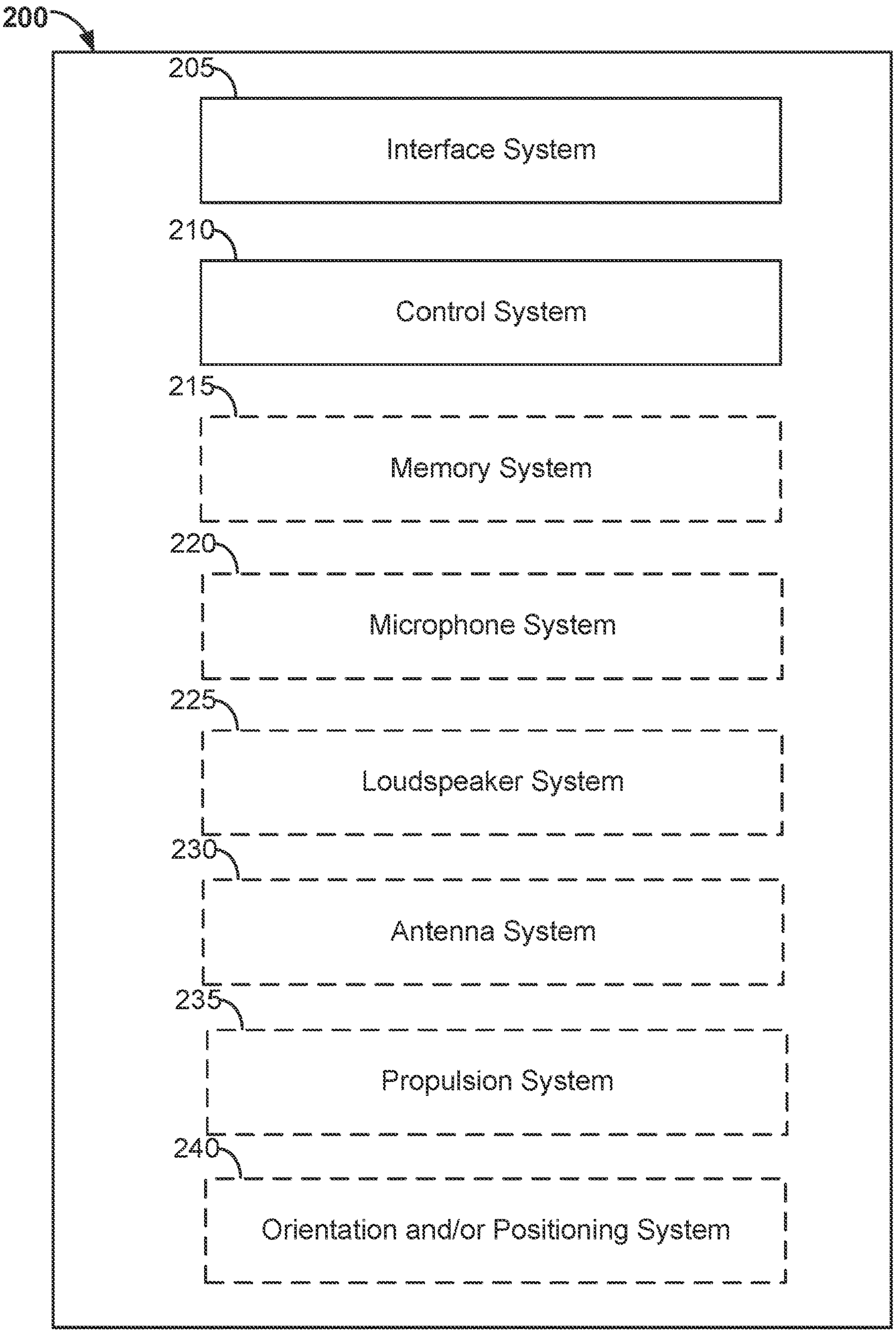
FIG. 2 shows examples of components of an apparatus capable of implementing various aspects of this disclosure.

FIG. 2 shows examples of components of an apparatus capable of implementing various aspects of this disclosure. The apparatus 200 may, for example, be configured to perform the methods described herein with reference to FIGS. 1 and/or 3. According to some examples, the apparatus 200 may be, or may include, a smart audio device (such as a smart speaker) that is configured for performing at least some of the methods disclosed herein. In other implementations, the apparatus 200 may be, or may include, another device that is configured for performing at least some of the methods disclosed herein. In some implementations the apparatus 200 may be, or may include, a smart home hub or a server. According to some implementations, the apparatus 200 may be, or may include, a self-propelled device that includes, or that is configured to transport, a sound-producing device. The self-propelled device may or may not be capable of autonomous movement (for example, of movement around an audio environment without receiving instructions from an external source), depending on the particular implementation.

In this example, the apparatus 200 includes an interface system 205 and a control system 210. The interface system 205 may, in some implementations, be configured for receiving input from each of a plurality of microphones in an environment. The interface system 205 may, in some examples, include one or more network interfaces and/or one or more external device interfaces (such as one or more universal serial bus (USB) interfaces). According to some implementations, the interface system 205 may include one or more wireless interfaces. The interface system 205 may include one or more devices for implementing a user interface, such as one or more microphones, one or more loudspeakers, a display system, a touch sensor system and/or a gesture sensor system. In some examples, the interface system 205 may include one or more interfaces between the control system 210 and a memory system, such as the optional memory system 215 shown in FIG. 2. However, in some examples the control system 210 may include a memory system.

The control system 210 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some implementations, the control system 210 may reside in more than one device. For example, a portion of the control system 210 may reside in a device within the audio environment 100 that is depicted in FIG. 1 (such as one of the audio devices 105*a*-105*d* or a smart home hub (not shown)), and another portion of the control system 210 may reside in a device that is outside the audio environment 100, such as a server, a mobile device (e.g., a smartphone or a tablet computer), etc. The interface system 205 also may, in some such examples, reside in more than one device.

In some implementations, the control system 210 may be configured for performing, at least in part, the methods disclosed herein. According to some examples, the control system 210 may be configured for implementing the methods described reference to FIG. 3.

In some examples, the apparatus 200 may include the optional microphone system 220 that is depicted in FIG. 2. The microphone system 220 may include one or more microphones. In some examples, the microphone system 220 may include an array of microphones.

In some examples, the apparatus 200 may include the optional loudspeaker system 225 that is depicted in FIG. 2. The loudspeaker system 225 may include one or more loudspeakers. In some examples, the microphone system 220 may include an array of microphones. In some such examples the apparatus 200 may be, or may include, an audio device. For example, the apparatus 200 may be, or may include, one of the audio devices 105*a*-105*d* shown in FIG. 1.

In some examples, the apparatus 200 may include the optional antenna system 230 that is shown in FIG. 2. According to some examples, the antenna system 230 may include an array of antennas. In some examples, the antenna system 230 may be configured for transmitting and/or receiving electromagnetic waves.

According to some implementations, the apparatus 200 may include the optional propulsion system 235. The optional propulsion system 235 may, for example, include one or more wheels, one or more electric motors, etc. According to some such implementations, the apparatus 200 may be, or may include, a self-propelled device. The self-propelled device may or may not be capable of autonomous movement, depending on the particular implementation. According to some examples, the apparatus 200 may be a self-propelled device that is configured to operate, at least in part, according to signals received via the antenna system 230. The signals may be received from another device, such as a remote control device, an audio device, a smart home hub, etc.

Although not shown in FIG. 2, in some implementations the apparatus 200 may include apparatus for providing location control data. For example, the apparatus 200 may include the orientation and/or positioning system 240. When present the orientation and/or positioning system 240 may include an inertial sensor system, one or more magnetometers, a positioning system, or combinations thereof. The inertial sensor system, if present, may include one or more accelerometers, one or more gyroscopes, or combinations thereof.

Some or all of the methods described herein may be performed by one or more devices according to instructions (e.g., software) stored on one or more non-transitory media. For example, some or all of the methods described herein may be performed by the control system 210 according to instructions stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 215 shown in FIG. 2 and/or in the control system 210. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 210 of FIG. 2.

Figure 3:
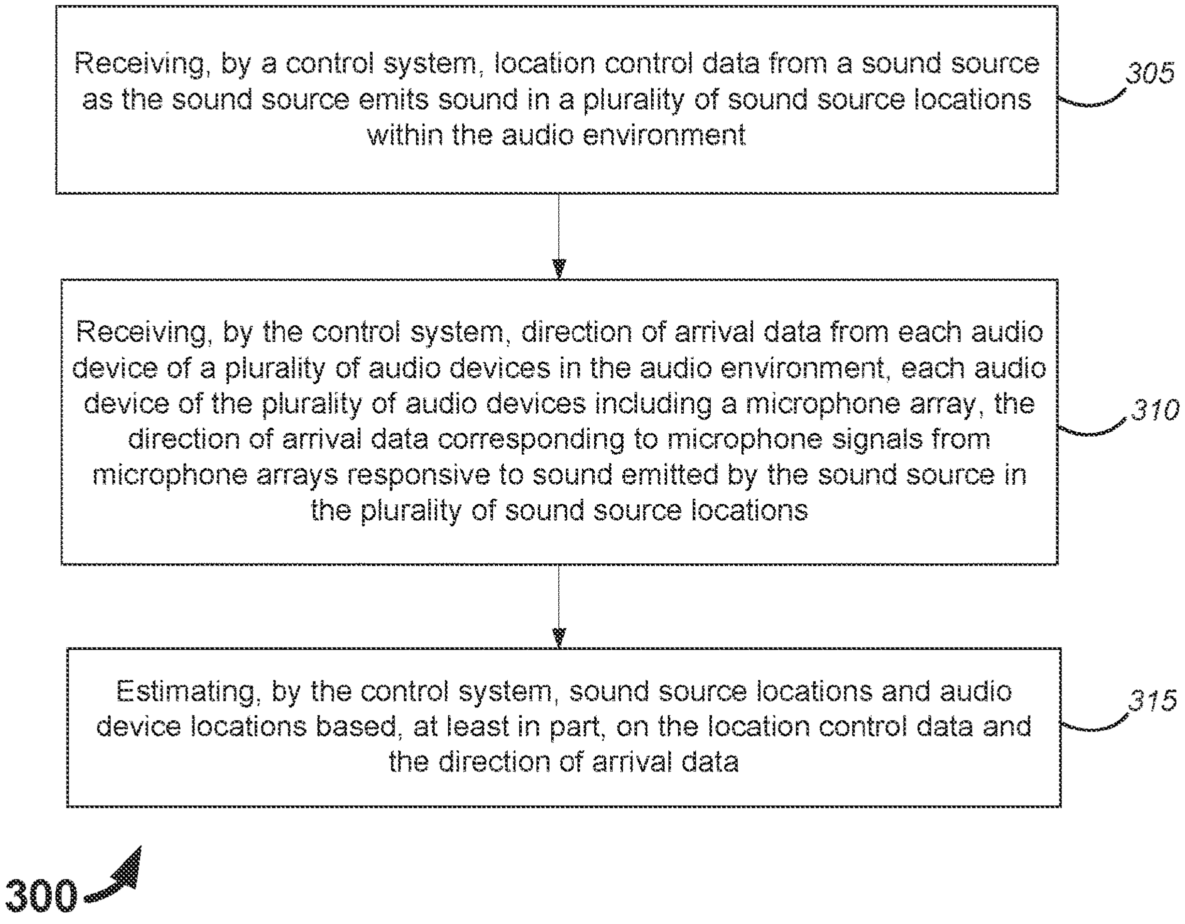
FIG. 3 shows a flow diagram that outlines one example of a method that may be performed by an apparatus disclosed herein.

FIG. 3 shows a flow diagram that outlines one example of a method that may be performed by an apparatus disclosed herein. For example, method 300 may be performed, at least in part, by the control system 210 of the apparatus 200 shown in FIG. 2. The blocks of method 300, like other methods described herein, are not necessarily performed in the order indicated. In some instances, one or more of the blocks may be performed in parallel. Moreover, such methods may include more or fewer blocks than shown and/or described.

In this example, method 300 involves estimating locations in an audio environment. According to this example, block 305 involves receiving, by a control system, location control data from a sound source as the sound source emits sound in a plurality of sound source locations within the audio environment. In some examples, the location control data may be, or may include, inertial sensor data. The inertial sensor data may, for example, include accelerometer data, gyroscope data, magnetometer data, or combinations thereof. In some examples, the location control data may be, or may include, Cartesian coordinate data, such as (x,y) coordinate data or (x,y,z) coordinate data, polar coordinate data, spherical coordinate data, etc.

The location control data may, for example, be provided by a device that is moving around the audio environment. In some examples, the device providing the location control data may itself be the sound source. In other examples, the device providing the location control data may be transported by a person or by another device. In some examples, an apparatus that is configured for moving around the audio environment also may be configured for determining the location control data. In some such examples, an apparatus that is configured for moving around the audio environment also may be configured for providing the location control data to another device, for example via wireless transmission.

Some examples may involve providing, by the control system, sound source location instructions for the sound source. As described elsewhere herein, in some instances the sound source may be a person who is moving around the audio environment. In some examples, the sound source may be carried by a person who is moving around the audio environment. According to some such examples, providing the sound source location instructions may involve providing one or more user prompts for a user of the sound source. Providing the one or more user prompts may, for example, involve presenting one or more visual prompts on a display. The one or more visual prompts may include one or more textual prompts, one or more graphical prompts, etc. Alternatively, or additionally, providing the one or more user prompts may involve providing one or more audio prompts via a loudspeaker system of a hand-held device, via one or more other audio devices in the audio environment, etc.

With reference to FIG. 1, in some such examples a mobile device used by the user 101, such as a cellular telephone or other mobile device, may be provided with a software application or "app" that causes the mobile device to provide audio prompts, video prompts, or a combination thereof, for moving around the audio environment 100. For example, the app may cause a series of prompts to be presented to the user 101, via the mobile device, to identify audio devices in the audio environment 100 (or another audio environment) and to move between the audio devices, to move around the audio devices, etc. According to some examples, the app may cause a series of prompts to be presented to the user 101, via the mobile device, to identify objects in the audio environment 100 (or another audio environment) that could potentially cause sound absorption, sound reflections, etc., (such as walls, furniture items, etc.) and to move between the objects, around the objects, etc.

In some implementations, one or more user prompts may be provided during an "online" process of estimating audio device locations, sound source locations, etc. In some such implementations, the prompts may be based, at least in part, on the process of estimating audio device locations. For example, the prompts may be made for the purpose of obtaining data that could potentially cause the process to converge on a solution more quickly, e.g., by obtaining additional measurement data as the sound source moves between particular audio devices, moves around particular audio devices, moves around objects in the audio environment, moves between objects in the audio environment, etc.

In other examples, the sound source may be, or may be transported by, an apparatus that is configured for moving around the audio environment. The apparatus may be a self-propelled device such as a robotic vacuum cleaner, a robotic servant, a robotic pet, etc. In some such examples, the self-propelled device may be an automated mobile sound source. According to some such examples, providing the sound source location instructions may involve providing control signals, instructions, or a combination thereof, to the automated mobile sound source. In some examples, the instructions may be provided via software. According to some examples, the control signals may be provided as wireless signals from another device. Some additional examples are described above with reference to FIG. 1.

In this example, block 310 involves receiving, by the control system, direction of arrival data from each audio device of a plurality of audio devices in the audio environment. According to this example, each audio device of the plurality of audio devices includes a microphone array. In this example, the direction of arrival data corresponds to microphone signals from microphone arrays responsive to sound emitted by the sound source in the plurality of sound source locations. In the example shown in FIG. 1, a microphone array of the audio device **105*b* may determine that the DOA of the sound source 101 is the angle 107. In block 310, a control system of the audio device 105*b*, a control system of one of the other audio devices, or a control system of another device (such as a smart home hub, a server, etc.) may receive DOA data from the audio device 105*b* corresponding with the angle 107**.

According to some examples, method 300 may involve receiving and processing other types of DOA data, such as electromagnetic DOA data. In some such examples, the electromagnetic DOA data may be based on electromagnetic waves that are transmitted by a device that is moving, or is being moved, within the audio environment. In some such examples, the electromagnetic DOA data may be determined by antenna systems of other devices in the audio environment, such as audio devices, that receive the transmitted electromagnetic waves.

In some examples, the receiving control system may be configured to convert DOA data in local coordinates received from another audio device to global coordinates or audio environment coordinates, such as coordinates of the audio environment coordinate system 120 shown in FIG. 1. For example, if method 300 is performed by a control system of the audio device **110*a* of FIG. 1, in some implementations the control system of the audio device 110*a*** may be configured to convert DOA data from the audio device

105*b*, which are in the local coordinates of the audio device 105*b* in this example, to coordinates of another coordinate system. The other coordinate system may be the audio environment coordinate system 120, the local coordinate system of the audio device 110*a* (as indicated by the orientation of the arrow 110*a*), or another coordinate system.

According to this example, block 315 involves estimating, by the control system, sound source locations and audio device locations based, at least in part, on the location control data and the direction of arrival data. In some examples, estimating the sound source locations and the audio device locations may involve a recursive process. In some examples, method 300 may involve estimating, by the control system, one or more sound source kinematic properties based, at least in part, on the location control data. The sound source kinematic properties may, for example, include sound source velocity data, sound source acceleration data, or a combination thereof.

In some examples, method 300 may involve controlling one or more aspects of audio processing for audio data played back by one or more audio devices of the plurality of audio devices based, at least in part, on the audio device locations. The one or more aspects of audio processing may, for example, include rendering the audio data for playback, acoustic echo cancellation or a combination thereof. In some examples, controlling the one or more aspects of audio processing may be based, at least in part, on the orientation of one or more audio devices in the audio environment.

Some examples of method 300 may involve receiving, by the control system, audio level data from one or more audio devices of the plurality of audio devices. The audio level data may correspond to the sound emitted by the sound source in the plurality of sound source locations. Some such examples may involve estimating, by the control system, one or more audio device orientations based, at least in part, on the audio level data. According to some examples, audio device orientations may be estimated based on both DOA data and audio level data. In some such examples, the audio device orientations based on audio level data may be used to disambiguate two or more possible audio device orientations that were estimated according to DOA data.

For example, an audio device orientation may be determined according to a microphone array orientation. The microphone array orientation may be determined based, at least in part, on the audio level data. For example, if the sound source is emitting sound at the same level in a variety of positions, some of which are at the same distance from a particular audio device, an amplitude of microphone signals from the audio device's microphone array may correspond with a particular position of the sound source, among the positions which were at the same distance from the audio device. In some examples, controlling the one or more aspects of audio processing may be based, at least in part, on the orientation of one or more audio devices in the audio environment.

Some examples of method 300 may involve estimating, by the control system, one or more acoustic decay properties of the audio environment based, at least in part, on the audio level data. The one or more acoustic decay properties may, for example, include an acoustic decay critical distance. One example of estimating audio environment acoustic properties may involve a combination of sound source location control data, microphone signal levels measured by devices 105, audio device location data, and/or other properties derived from microphone signals measured by devices 105. This combination of data can be gathered for a plurality of sound source locations, guided or unguided, thereby providing the spatially distributed information needed to estimate the acoustic properties of the audio environment overall. The estimation procedure may take place live during calibration or offline.

According to some examples, one or more aspects of audio processing for audio device playback may be based, at least in part, on the one or more estimated acoustic decay properties of the audio environment. The one or more aspects of audio processing may, for example, include acoustic echo cancellation, rendering audio data for playback, or combinations thereof.

In some examples, the sound source locations and the audio device locations may be estimated at more than one time. In some such examples, estimating the sound source locations and audio device locations may involve making a first estimation based on first location control data and first direction of arrival data obtained during a first time interval. The first time interval may, for example, correspond to an initial audio device setup in an audio environment.

According to some examples, estimating the sound source locations and audio device locations may involve making a second estimation based on second location control data and second direction of arrival data obtained during a second time interval. The second time interval may, in some instances, be after the first time interval. For example, if first time interval corresponds to an initial audio device setup in an audio environment, the second time interval may correspond to a second, third, or $N^{th}$ recalibration process that takes place after the initial audio device setup.

In some such examples, the recalibration process may occur after a determined or pre-set time interval, which may in some instances be a user-selectable time interval. Alternatively, or additionally, the recalibration process may be triggered by a change in the audio environment, such as the re-location of an audio device, the re-orientation of an audio device, the addition of a new audio device, etc.

Some examples may involve using estimated audio device locations from the first estimation as inputs for making the second estimation. In some examples, the second direction of arrival data may correspond to microphone signals responsive to human speech, such as human speech that is detected when a person is moving around in the audio environment. In some such examples, a mobile device, such as a cellular telephone or a wearable device (such as a smart watch) may provide location control data as the human sound source emits sound in a plurality of sound source locations within the audio environment.

According to some examples, estimating the sound source locations and the audio device locations may involve a non-causal process. In some such examples, the non-causal process may be, or may include, a Maximum Likelihood process. In some examples, the non-causal process may be implemented after all, or substantially all, the location data and the DOA data have been received. Such post-data-gathering processes may be referred to herein as "offline" processes.

Alternatively, or additionally, in some examples a process of estimating the sound source locations and audio device locations may begin during a time interval in which location control data and direction of arrival data are being obtained. Such methods or processes may be referred to herein as "online" processes. Some online methods or processes may involve making a prediction of a state of a system that includes the sound source and the plurality of audio devices, comparing the prediction with an observation of the system and correcting the prediction based, at least in part, on the observation. Some such methods may involve determining a weight for correcting the prediction based, at least in part, on the observation.

According to some such examples, estimating the sound source locations and the audio device locations may involve implementing, by the control system, a Kalman filter. In some examples, the Kalman filter may be an extended Kalman filter or an Unscented Kalman filter.

In some implementations, a control system implementing a Kalman Filter may process multiple observations, for example of sound source locations and audio device locations, as these observations are made at various locations within an audio environment during a time interval. In some examples, the observations may include audio level data. Upon converging, a control system implementing the Kalman filter may determine a solution that contains the positions and orientations of the audio devices. In some examples, the solution may include estimated positions of the sound source, estimated velocities of the sound source, or combinations thereof. In some examples, the solution may include an estimated model of the acoustic decay properties of the audio environment. The contents of such solutions can be extremely useful for implementing various aspects of audio processing, particularly in an orchestrated and connected audio device ecosystem. For example, the acoustic decay model may be provided to one or more modules that are configured for audio data rendering, audibility interpolation, equalization (EQ) interpolation, acoustic echo cancellation, etc., to improve the performance of such modules.

According to some such examples, a control system implementing the Kalman Filter may make predictions of one or more estimated states based on a prediction model, and may correct these predictions based on real-world observations and observation models, eventually converging on a solution. In some instances, the prediction model may be a straightforward, frictionless kinematic model in which the audio devices are presumed to be static and the sound source is presumed to move according to the current velocity state. The kinematic model may be amended by control data inputs, which may indicate, or account for, acceleration altering the velocity of the sound source. According to some examples, the observation models may also be straightforward functions for computing DOA in a Euclidean space and for computing level based on Euclidean distance.

TABLE 1

| | |
|---|---|
| Total devices | N |
| Device index, time index | i, t |
| Time step | $\Delta t$ |
| State Vector at time step t | $\xi_t$, $\mu_t$ |
| Prediction model matrix | F |
| Control input vector | B |
| DOA measurement | $\phi_{i,t}$ |
| Level measurement | $\lambda_{i,t}$ |
| DOA observation model | $h_i(\xi_t)$ |
| Level observation model | $g_i(\xi_t)$ |
| Observation model Jacobian | $H_t$ |
| Distance from device i to source | $\rho_{i,t}$ |
| Source position, velocity estimates | $x_t$, $y_t$, $\dot{x}_t$, $\dot{y}_t$ |
| Device i position estimate | $x_{i,t}$, $y_{i,t}$ |
| Device i orientation estimate | $\alpha_i$ |
| Critical distance estimate | $d_t^c$ |
| Source gain | G |
| Kalman gain | $K_t$ |
| Process covariance | $\Sigma_t$ |
| Process noise covariance | Q |
| Observation noise covariance | R |

Table 1 indicates the meaning of each of the symbols used in the following discussion. In some examples, a control system that implements a Kalman filter may be configured to model the positions of audio devices and the positions of a moving sound source over time as a multidimensional Gaussian probability distribution with mean $\mu$ and covariance matrix $\Sigma$ at time t.

A Kalman filter functions by making a prediction of the state of a system and comparing that prediction with an observation or measurement of the system. The measurement of the system can be direct (in other words, each state parameter may be directly observed) or indirect (in other words, some other parameter may be observed, which is a function of the state). The Kalman Gain determines the weight with which the observation corrects the prediction.

Figure 4A:
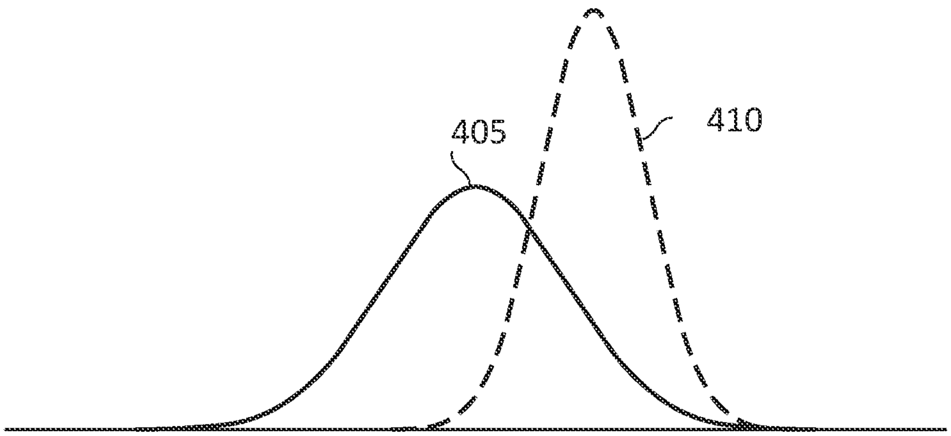
FIGS. 4A and 4B show an example of updating a single parameter.
Figure 4B:
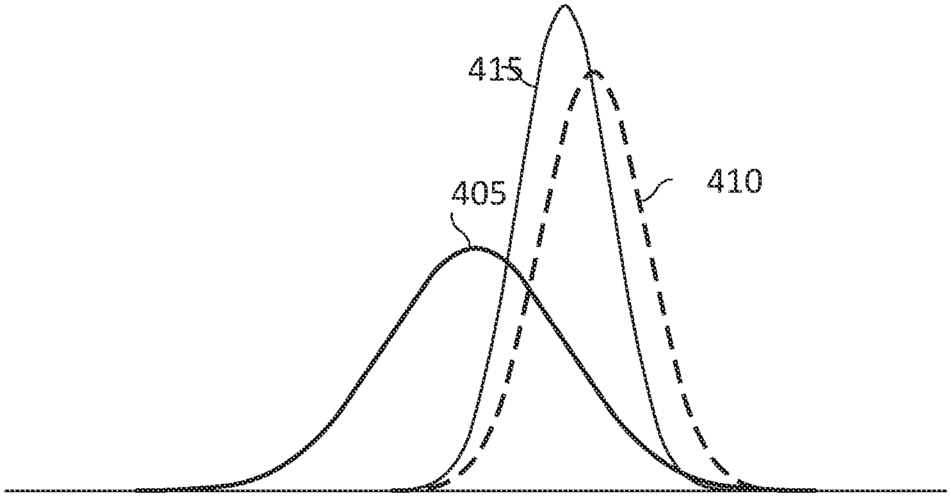

FIGS. 4A and 4B show an example of updating a single parameter. In FIG. 4A, the solid line 405 represents a prediction made by a Kalman filter. The dashed line 410 represents an observation made subsequent to the prediction represented by the solid line 405. In FIG. 4B, the solid line 415 represents a subsequent estimate made by the Kalman filter, taking into account the observation represented by the dashed line 410.

Some embodiments of the Kalman filter (such as the Extended Kalman Filter (EKF)) require a linear prediction model and a linear observation model. This requirement is so that Gaussian error distributions will remain Gaussian when transformed via the relevant functions.

Prediction Model

According to some examples, the prediction model may be a two-dimensional (2D) kinematic model that is linear. In some such examples, the prediction model may be expressed as follows:

$$x_t = x_{t-1} + \dot{x}_{t-1}\Delta t$$

$$y_t = y_{t-1} + \dot{y}_{t-1}\Delta t$$

In the foregoing equations, $$\dot{\square} = \frac{d}{dt}\square,$$

and $\Delta t$ represents the time step since the last measurement. The system of equations for applying the prediction model to the state will be referred to herein as $f(\xi_t)$, such that $\hat{\xi}_t = f(\xi_{t-1})$ is the predicted state of the system at time t.

In this example, the state includes a source with position and velocity $(x_t, y_t, \dot{x}_t, \dot{y}_t)$, N Rx devices with positions and orientations $(x_{i,t}, y_{i,t}, \alpha_{i,t})$ $i \in [1, N]$, and a critical distance estimate $$d_t^c.$$

There is no kinematic update to the Rx devices in this example, because in our calibration model they are stationary. A stationary acoustic decay model is also assumed. Because $f(\xi_t)$ is linear, we can form a matrix F to operate on state $\xi_{t-1}$ and give a prediction: $\hat{\xi}_t = F\xi_{t-1}$.

Observation Model

Having established that the prediction model is linear, we now consider the observation model. This example involves observing DOAs and levels of the acoustic source as measured at a microphone array of each audio device. However, some alternative implementations may not involve obtaining level measurements. Level measurements are only needed if the audio device orientations are unknown. If the audio device orientations are known, DOA-only observations may be used to solve the system.

The observation $z_t$ in this example of the disclosed system may be represented as follows:

$$z_t = [\phi_{1,t}, \cdots, \phi_{N,t}, \lambda_{1,t}, \cdots, \lambda_{N,t}]^T$$

In this example, observation model $h_i(\xi_t)$ corresponds to measurements $\phi_{i,t}$, and observation model $g_i(\xi_t)$ corresponds to measurements $\lambda_{i,t}$. The DOA observation model may be represented as follows:

$$h_i(\xi_t) = \arctan\left(\frac{y_t - y_{i,t}}{x_t - x_{i,t}}\right) - \alpha_{i,t}$$

According to this example, the level observation model makes use of an acoustic decay model that incorporates a critical distance $d^c$:

$$g_i(\xi_t) = G\sqrt{\frac{1}{\rho_{i,t}^2} + \frac{1}{d_t^c}}$$

The DOA and level observation models are nonlinear functions, and therefore must be linearized about the point $\xi_t$ in state space if we wish to use the Extended Kalman Filter (EKF). Using the equations for $z_t$, $h_i(\xi_t)$, $g_i(\xi_t)$, the Jacobian matrix for the observation model H can be analytically computed in order to accomplish this linearization.

The Extended Kalman Filter

To emphasize the fact that the system components are modeled with a multi-dimensional Gaussian distribution, we will now change the symbol for state $\xi$ to $\mu$, because $\mu$ is often used to represent the mean of a distribution. The Extended Kalman Filter (EKF) update may be represented as follows for each new time step t:

$$\hat{\mu}_t = F\mu_{t-1} + \Delta t B$$

$$\hat{\sum}_t = F\sum_{t-1} F^T + Q$$

$$K_t = \hat{\sum}_t H_t^T\left(H_t \hat{\sum}_t H_t^T + R\right)^{-1}$$

$$\mu_t = \hat{\mu}_t + K_t(z_t - h(\hat{\mu}_t))$$

$$\sum_t = \hat{\sum}_t - K_t H_t \hat{\sum}_t$$

According to this example, the solution results are in the final $\mu_t$ after the filter has converged. Convergence may be determined, for example, by calculating the magnitude of change in the process covariance matrix, relative to the expected or tuned process noise threshold, between filter iterations. A relatively small change in the process covariance matrix, relative to the expected or tuned process noise threshold, may indicate convergence. The uncertainties of each part of the current state solution also may be inferred from the process covariance. In some examples, a threshold may be set for the tolerable uncertainty of one or more variables that represent the state. According to some such examples, convergence may be determined when the one or more variables are at or within the threshold(s). Some other indicia of convergence are disclosed below with reference to FIGS. 5A-5F.

According to some disclosed implementations, the following steps may be followed:

1. Define a state prediction model, such as a simple frictionless kinematic model that incorporates control inputs from a moving source, such as accelerometer data.
2. Define observation functions in terms of the state. In this example, the observations are DOA and, optionally, level.
3. If an EKF is being implemented, compute the Jacobian of the observation vector to linearize the observation model(s) about the current point in state space.
4. Initialize and tune the process covariance and noise covariance matrices respectively, using known observation variances (which may be dependent on sensor depth and noise) and tuned process noise values. In some examples, baseline sensor noise variance may be obtained from specification sheets. Some examples may involve choosing one or more regularization constants to help stabilize matrix inversions.
5. Initialize the state using the first observation and observation variances.
6. Propagate each subsequent observation through the Kalman Filter until it converges on a most optimal state. Convergence can be sensed via the process covariance matrix, for example. The diagonal of the covariance matrix contains the variances, which may be interpreted as error bars or error ranges.

Figure 5A:
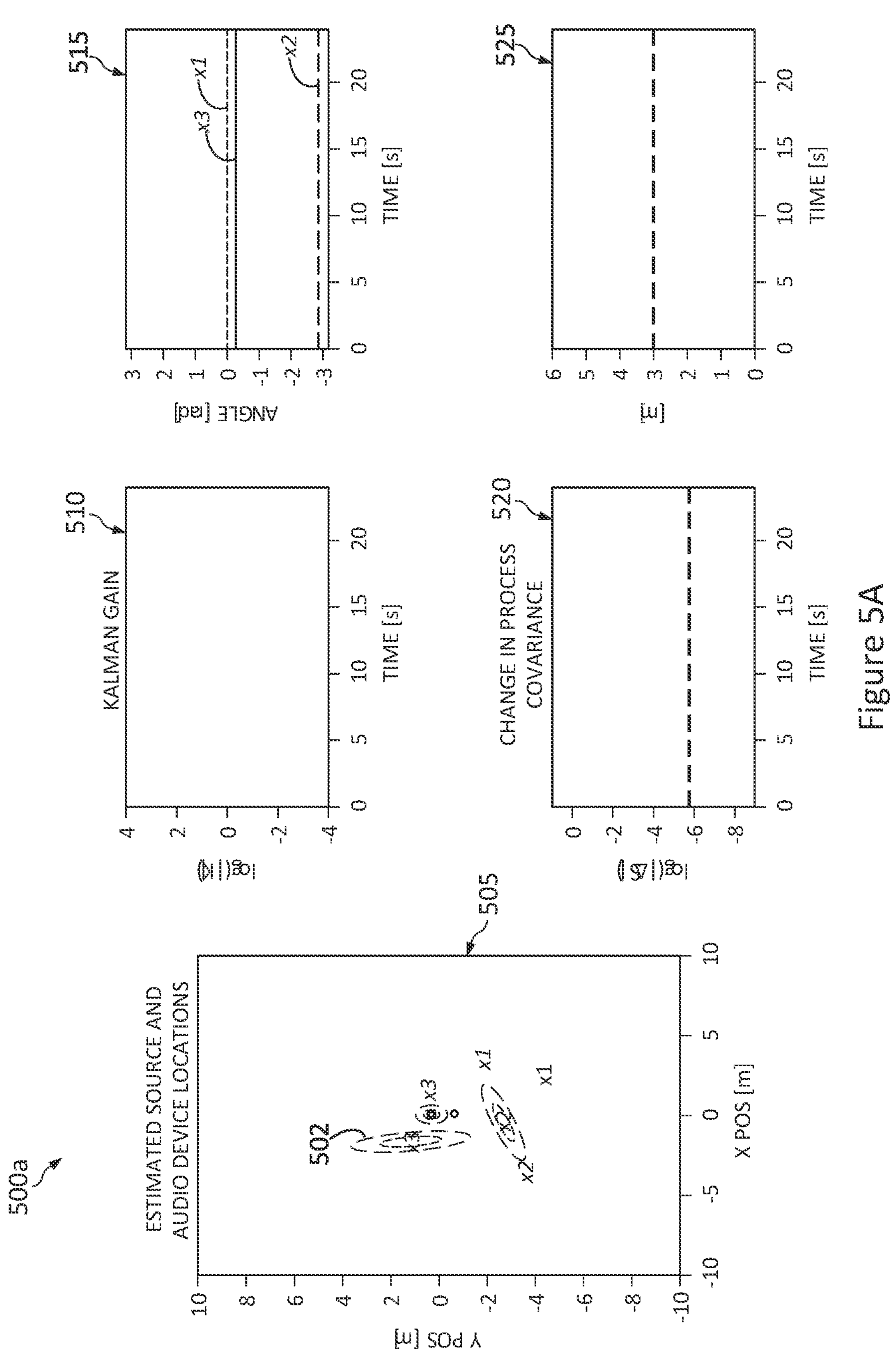
FIGS. 5A, 5B, 5C, 5D, 5E and 5F show examples of graphical user interfaces (GUIs) that may be presented on a display device to illustrate a process of estimating sound source locations and audio device locations.
Figure 5B:
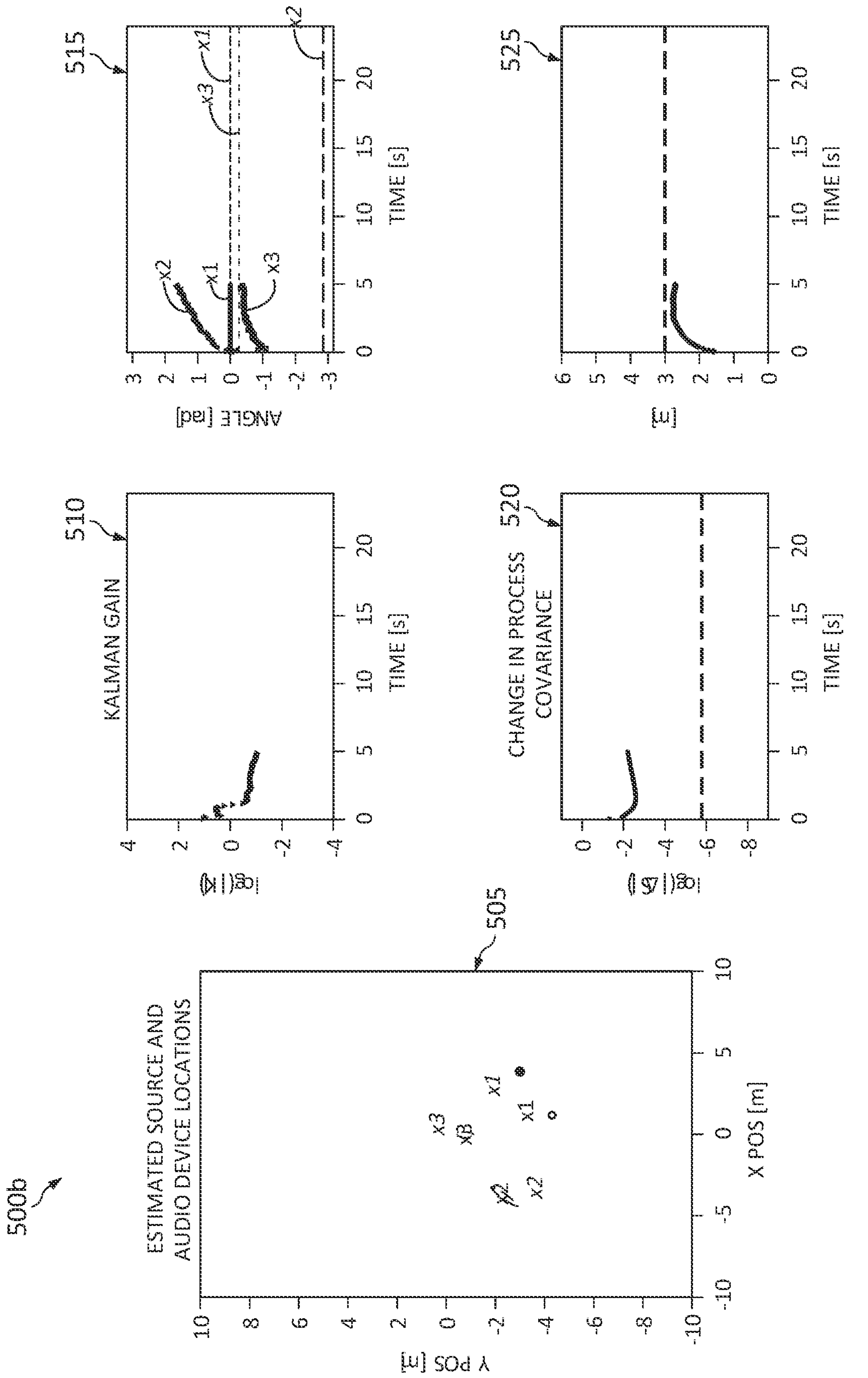
Figure 5C:
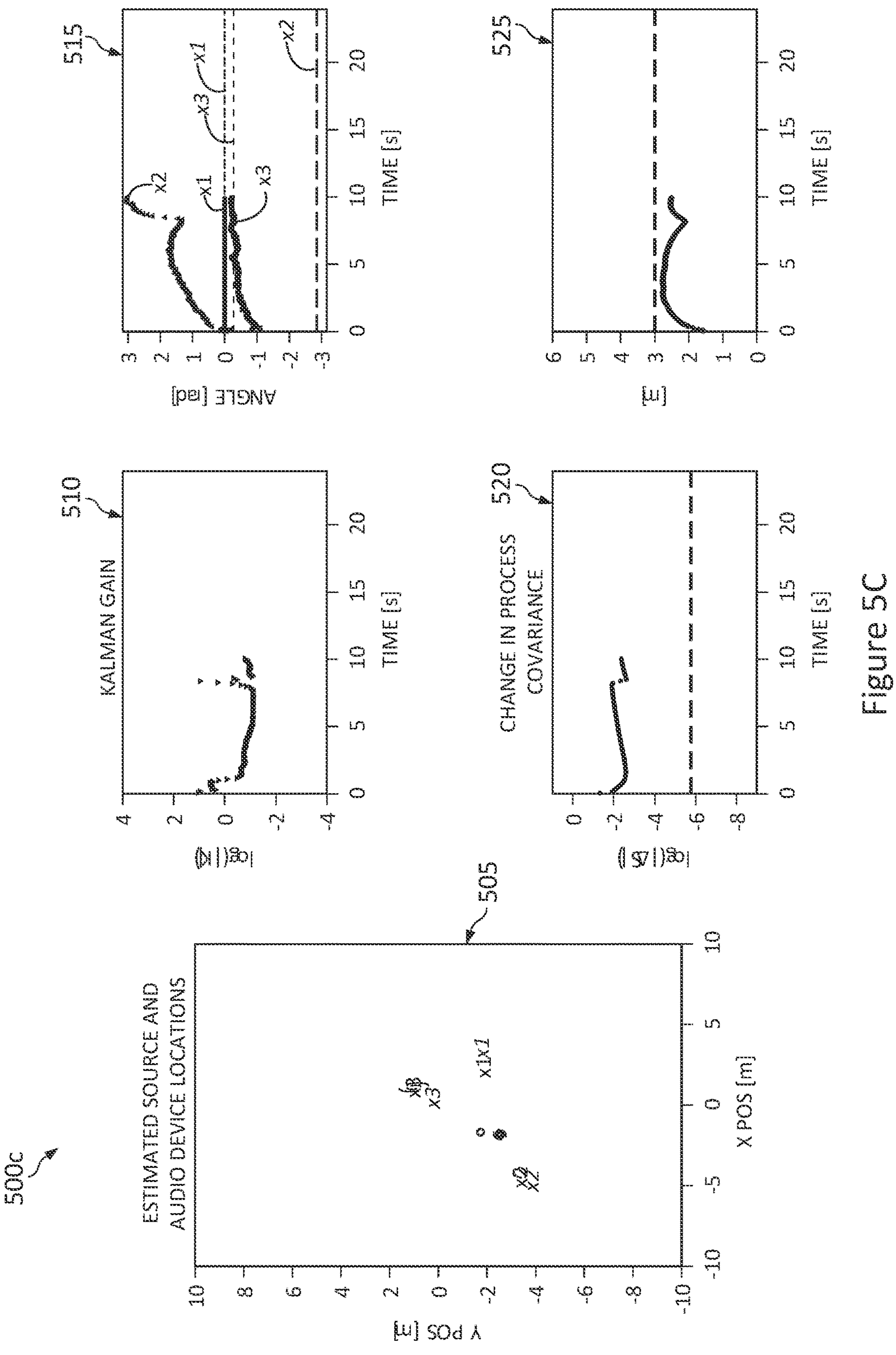
Figure 5D:
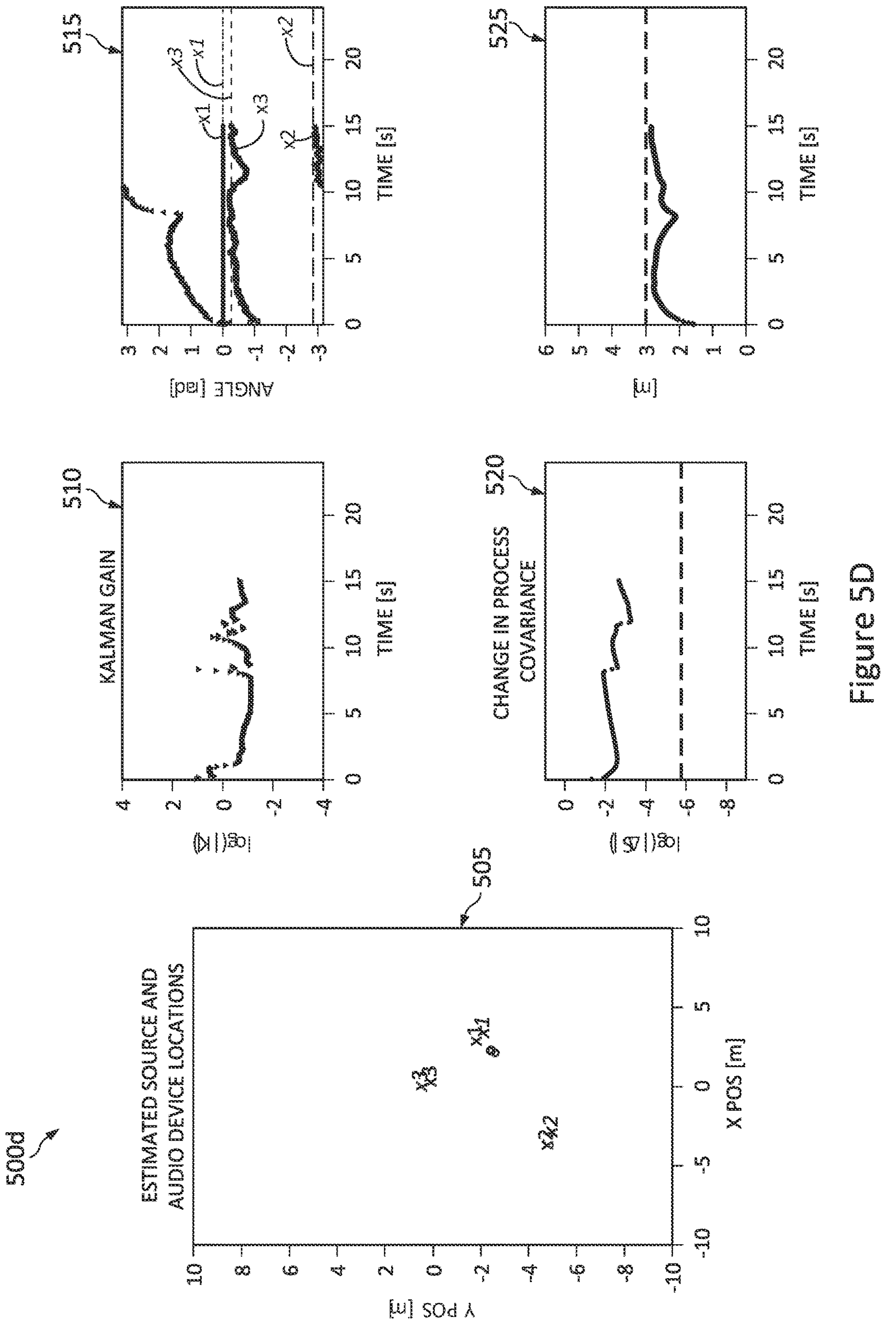
Figure 5E:
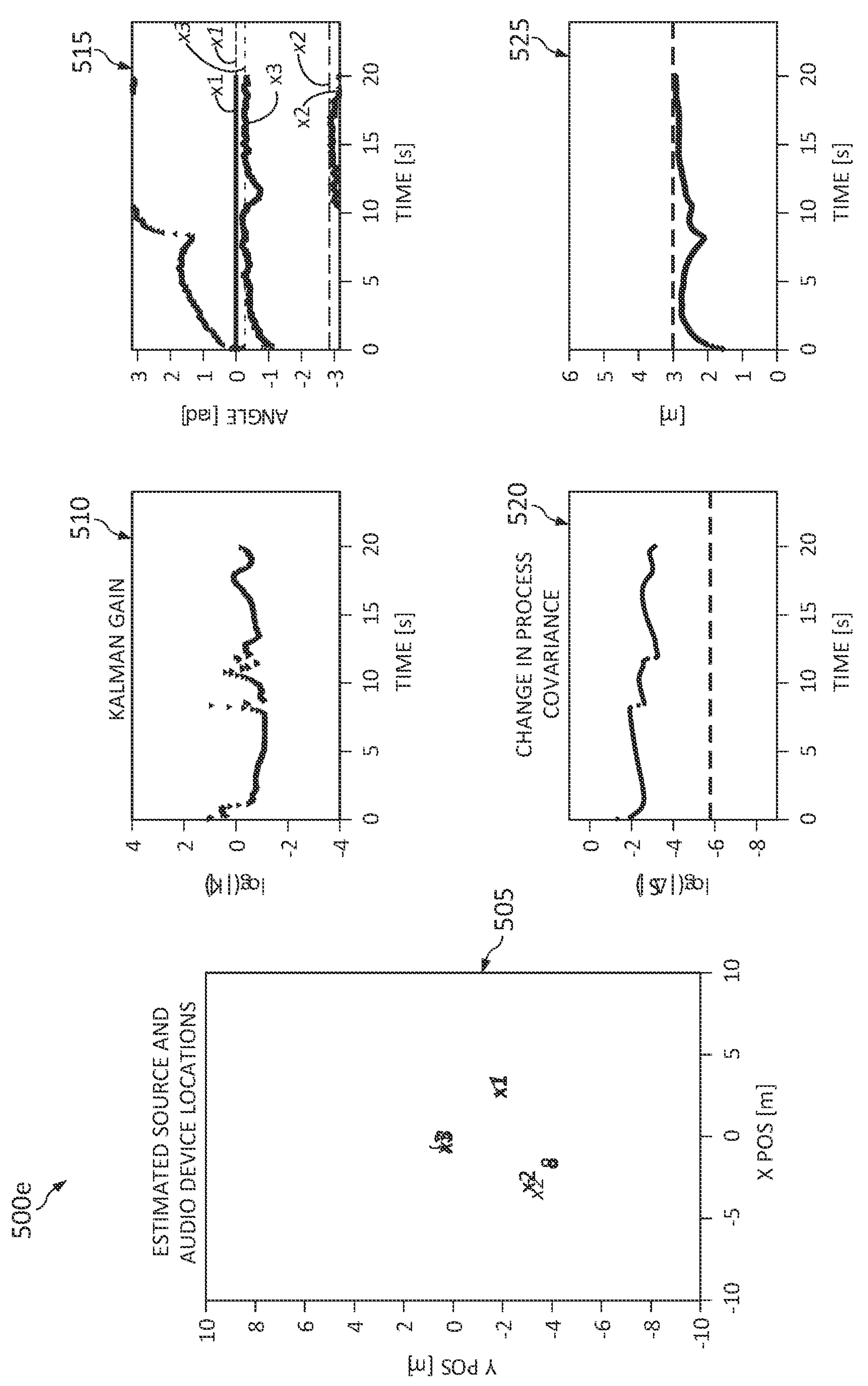
Figure 5F:
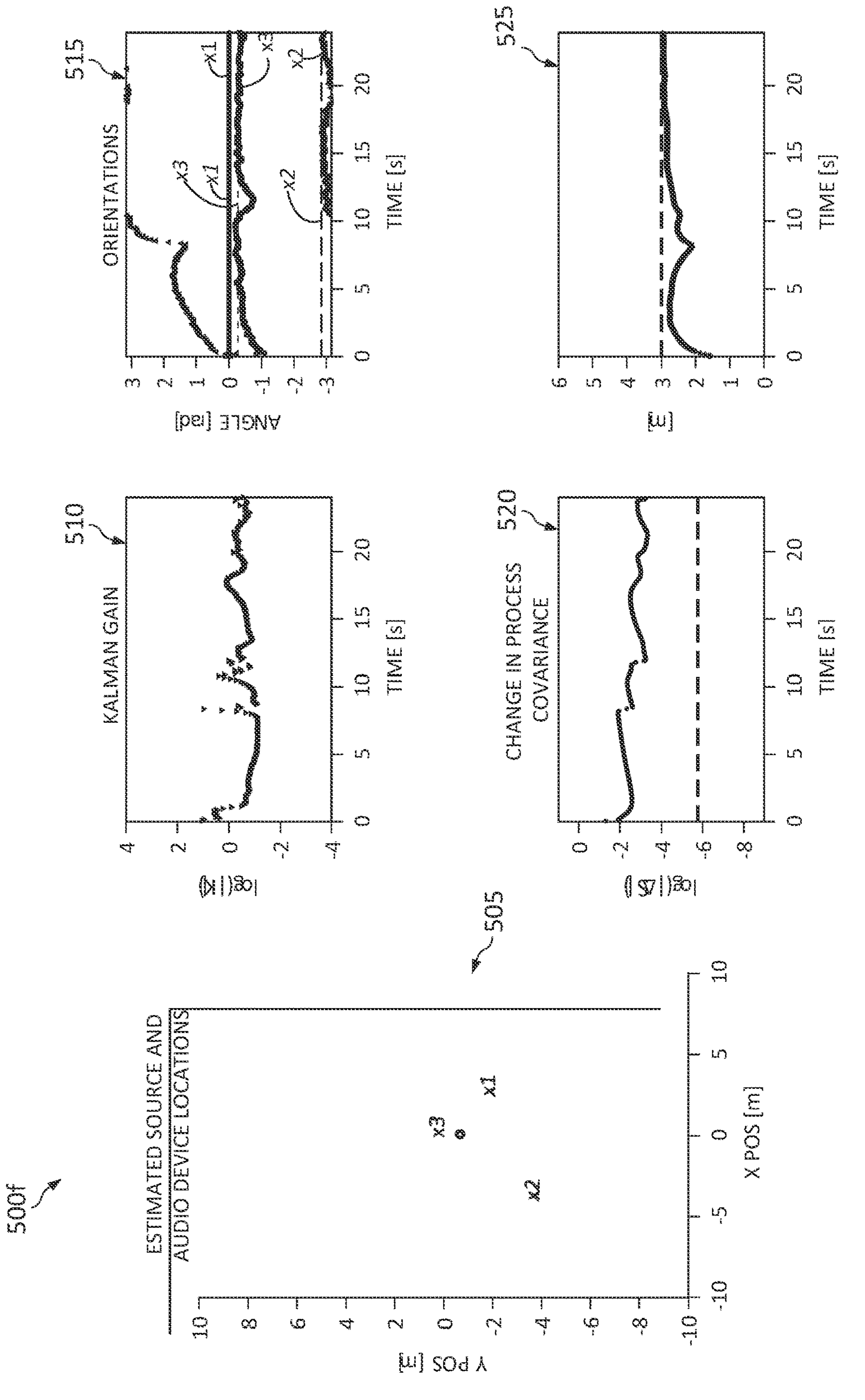

FIGS. 5A, 5B, 5C, 5D, 5E and 5F show examples of graphical user interfaces (GUIs) that may be presented on a display device to illustrate a process of estimating sound source locations and audio device locations. In these examples, a control system is implementing an EKF to estimate the sound source locations and audio device locations. According to these examples, the GUI 500*a* of FIG. 5A represents the first frame of an animation representing a process of estimating sound source locations and audio device locations, the GUI 500*b* of FIG. 5B represents frame 50 of the animation, the GUI 500*c* of FIG. 5C represents frame 100 of the animation, the GUI 500*d* of FIG. 5D represents frame 150 of the animation, the GUI 500*e* of FIG. 5E represents frame 200 of the animation and the GUI 500*f* of FIG. 5F represents frame 250 of the animation.

According to these examples, each of the GUIs 500*a*-500*f* includes areas 505, 510, 515, 520 and 525. In these examples, each of the areas 505 includes a graph of estimated sound source and audio device locations in x,y coordinates, each of the areas 510 includes a graph of Kalman gain over time, each of the areas 515 includes a graph of estimated audio device orientations over time, with the vertical axis representing the orientation angle of each corresponding microphone array in radians, each of the areas 520 includes a graph of the change in process covariance over time and each of the areas 525 includes a graph of estimated critical distance over time.

In the examples shown in areas 505, audio device locations are indicated as x1, x2 and x3, and sound source locations are indicated by circles. In these examples, each of the areas 505 represents "ground truth" audio device locations as italicized text and numbers (for example, as x3) and represents estimated audio device locations as non-italicized text and numbers (for example, as x3). According to these examples, each of the areas 505 represents an estimated sound source location as a bold circle (in other words, a circle with a relatively heavier line weight) and a "ground truth" sound source location as a circle with a relatively lighter line weight.

Uncertainty ellipses 502 surrounding the estimated audio device locations and sound source locations decrease in size as the system converges to a solution. By the time represented by FIG. 5F, the uncertainty ellipses 502 are no longer visible and the estimated and ground truth locations are superimposed on one another, indicating that the system is at or near convergence. One or more of the size of the uncertainty ellipses 502, the offset between the estimated and ground truth locations, the change in the process covariance matrix, or a combination thereof, may be criteria for terminating the estimation process in some examples.

According to these examples, the dashed lines shown in each of the areas 515 represent the actual audio device orientations and the dashed line shown in each of the areas 525 represents the actual critical distance. In these examples, the dashed line shown in the areas 520 represents the expected minimum change in process covariance based on estimated process noise. Referring to the area 520 of FIG. 5F, one may observe that there was still some change in the process covariance matrix when the optimization process terminated. One also may observe that there was an overall downward trend of the change in the process covariance matrix over time, and that area 520 of FIG. 5F indicates a steep drop in the change in process covariance matrix during the last few frames, when the source location and the audio device locations and orientations were closely estimated.

In these examples, each frame represents 0.1 seconds, so that by frame 250, 25 seconds have elapsed. By this time, the control system that is implementing the EKF has converged on solutions for the estimated source and audio device locations, the estimated audio device orientations and the estimated critical distance.

As with other examples disclosed herein, the types, numbers, locations and orientations of elements shown in FIGS. 5A-5F are merely made by way of example. Other implementations may have different types, numbers and arrangements of elements, more or fewer graphs or charts, different quantities, variables, etc., being represented in the graphs or charts, more or fewer audio devices, audio devices in different orientations, audio devices in different locations, etc. For example, other GUIs also may represent the sound source velocity, the sound source acceleration, etc., over time.

The Unscented Kalman Filter

The same combination of prediction functions, observation functions, convergence sensing, etc., that are described above can be used with the Unscented Kalman Filter (UKF). However, the UKF does not require the computation of analytical Jacobians, but instead requires the calculation of sigma points and their propagation through the prediction and observation models. Sigma points are carefully chosen vectors from a multidimensional probability distribution such that their transformation through a nonlinear function optimally represents the transformation of the entire probability distribution. This approach adds complexity to the filter process but can improve the accuracy and convergence of the solution, due to better preserving the higher-order moments of distributions as they are propagated through nonlinear models.

Figure 6:
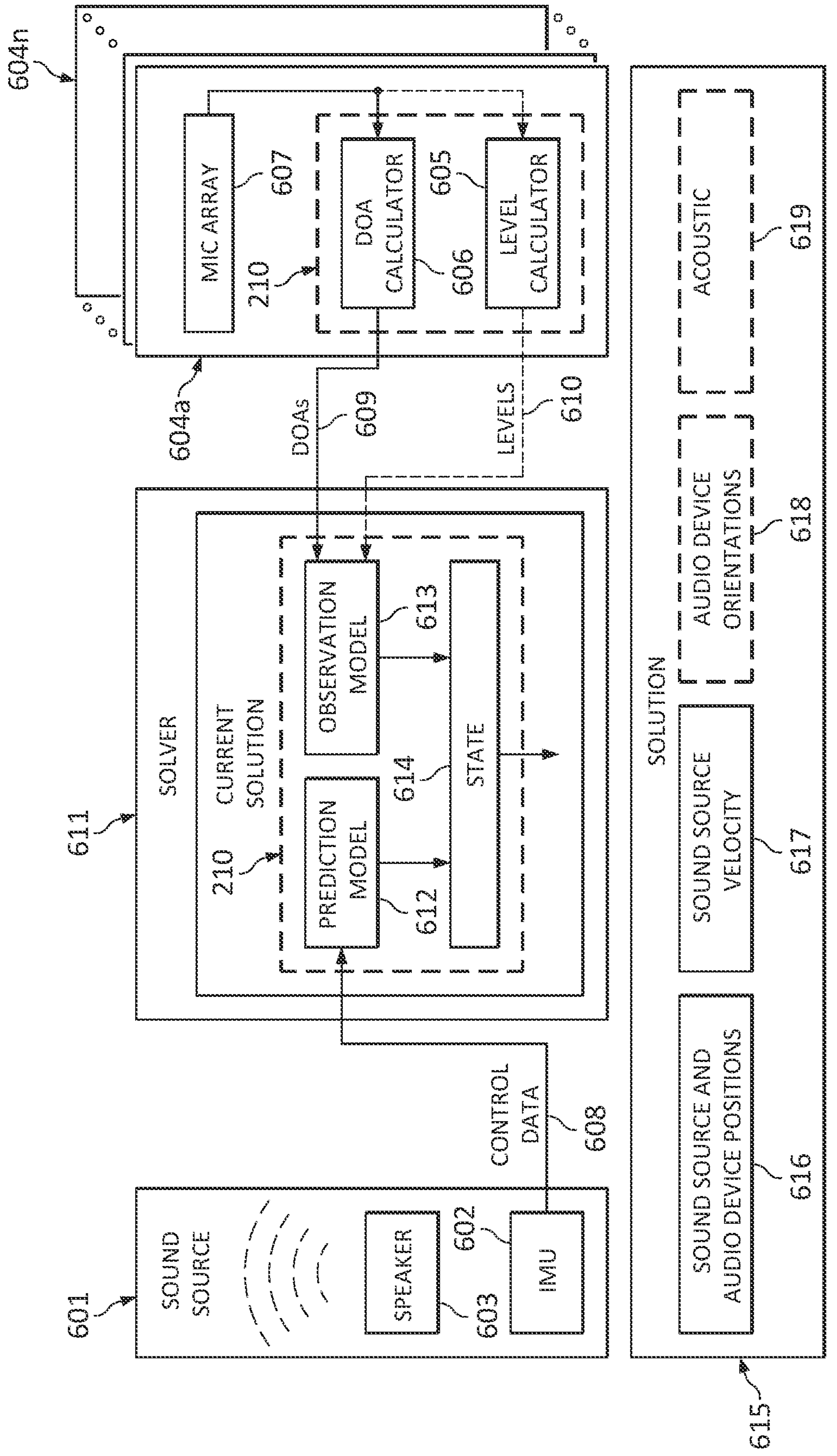
FIG. 6 is a block diagram showing elements that may be configured to perform one or more disclosed methods.

FIG. 6 is a block diagram showing elements that may be configured to perform one or more disclosed methods. According to this example, FIG. 6 shows a sound source 601 with an inertial measurement unit (IMU) 602 and a loudspeaker 603. The IMU 602 may include one or more accelerometers, one or more gyroscopes, or combinations thereof. In some examples, the sound source 601 may include a magnetometer. According to some examples, the sound source 601 may be configured to determine or estimate its own location.

In some examples, the sound source 601 may be transported by a person, whereas in some examples the sound source 601 may be, or may be transported by, a device that is configured to move around an audio environment. In this example, the sound source 601 is configured to stream control data 608 (also referred to herein as "location control data") while the loudspeaker 603 is sounding in a time interval during which observations are being made for a calibration process. In this example, the control data 608 are provided by the IMU 602.

In this example, each of the audio devices 604*a*-604*n* includes a level calculator 605, a DOA calculator 606 and a microphone array 607. In this example, the level calculator 605 and the DOA calculator 606 are implemented by an instance of the control system 210 that is shown in FIG. 2 and described above. According to this example, while the sound source 601 is streaming control data 608 and causing the loudspeaker 603 to emit sound in various locations of an audio environment, the audio devices 604*a*-604*n* are capturing audio via the microphone arrays 607 and are computing DOAs 606 and (optionally) levels 605. According to this example, the audio devices 604*a*-604*n* are also streaming DOA data 609 and (optionally) level data 610 in a time interval during which observations are being made for a calibration process.

The control data 608, DOA data 609 and (optionally) level data 610 are received by a solver 611. In this example, the solver 611 is implemented by another instance of the control system 210 that is shown in FIG. 2 and described above. In some examples, such as "offline" examples, the solver 611 may take the form of a Maximum Likelihood solver. In other examples, such as "online" examples, the solver 611 may take the form of a Kalman Filter. According to this example, control data 608 are processed via a prediction model 612, while DOA data 609 and (optionally) level data 610 are processed via an observation model 613. The solver 611 is configured to amend the solution state 614 until the solution state 614 has converged, for example when the difference between predictions and observations is minimized, when the difference between predictions and observations is at or below a threshold, etc. In this example, the solution 615 produced by the solver 611 includes estimated sound source and audio device positions 616, (optionally) sound source velocity 617, (optionally) audio device orientations 618, and (optionally) an acoustic critical distance 619 for the room.

As with other examples disclosed herein, the types, numbers, locations and orientations of elements shown in FIG. 6 are merely made by way of example. Other implementations may have different types, numbers and arrangements of elements. For example, in some alternative implementations one or more of the audio devices 604*a*-604*n* may provide raw microphone data to the solver 611 and the solver 611 may be configured to determine DOA, level, or both. If device orientations are known, the solver may omit the optional process of estimating audio device orientations 618. In some alternative implementations, the solver may omit the optional process of estimating sound source velocity.

Figure 7:
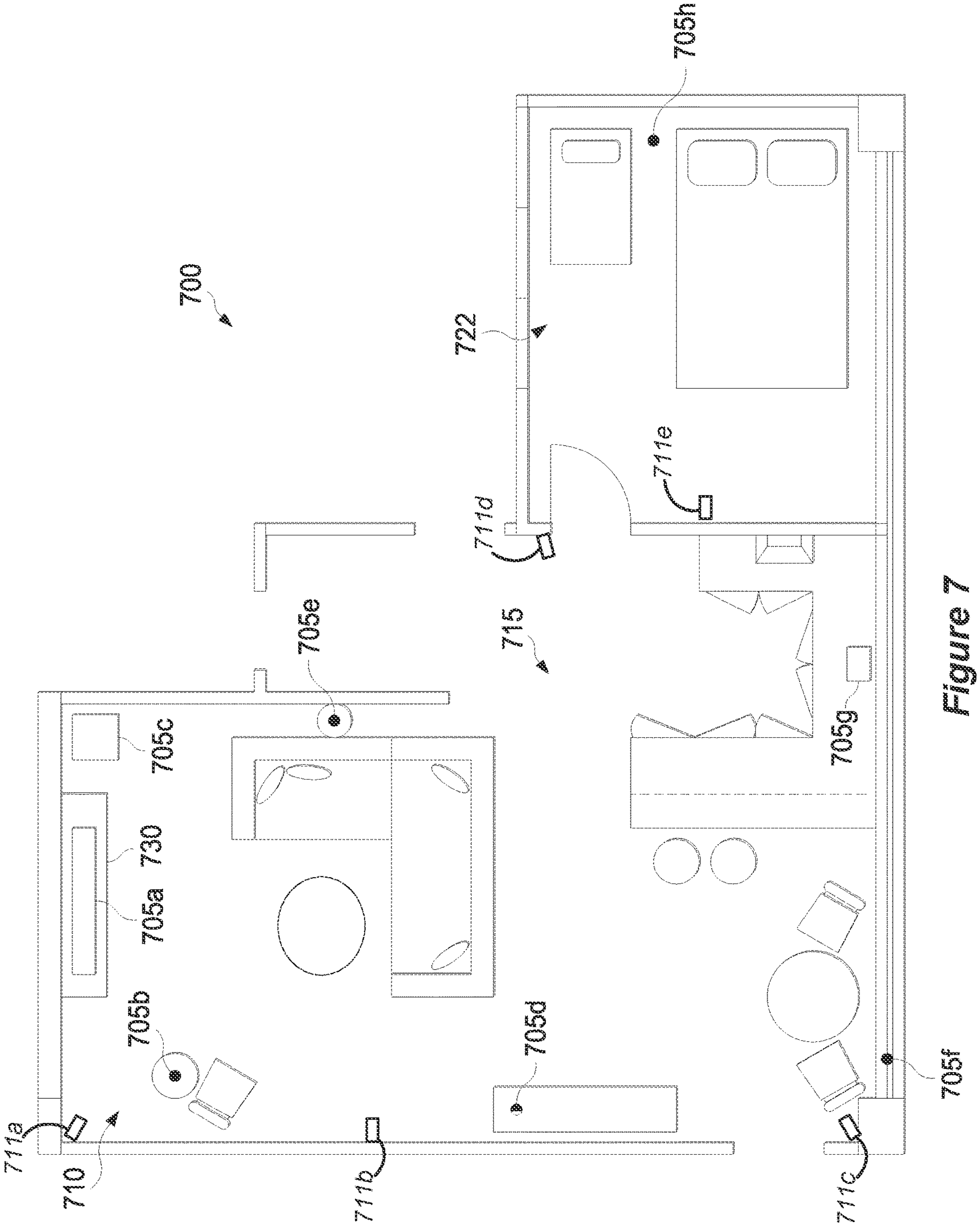
FIG. 7 shows an example of a floor plan of an audio environment, which is a living space in this example.

FIG. 7 shows an example of a floor plan of an audio environment, which is a living space in this example. As with other figures provided herein, the types and numbers of elements shown in FIG. 7 are merely provided by way of example. Other implementations may include more, fewer and/or different types and numbers of elements.

According to this example, the environment 700 includes a living room 710 at the upper left, a kitchen 715 at the lower center, and a bedroom 722 at the lower right. Boxes and circles distributed across the living space represent a set of loudspeakers 705*a*-705*h*, at least some of which may be smart speakers in some implementations, placed in locations convenient to the space, but not adhering to any standard prescribed layout (arbitrarily placed). In some examples, the television 730 may be configured to implement one or more disclosed embodiments, at least in part. In this example, the environment 700 includes cameras 711*a*-711*e*, which are distributed throughout the environment. In some implementations, one or more smart audio devices in the environment 700 also may include one or more cameras. The one or more smart audio devices may be single purpose audio devices or virtual assistants. In some such examples, one or more cameras of the optional sensor system 130 may reside in or on the television 730, in a mobile phone or in a smart speaker, such as one or more of the loudspeakers 705*b*, 705*d*, 705*e* or 705*h*. Although cameras 711*a*-711*e* are not shown in every depiction of the environment 700 presented in this disclosure, each of the environments 700 may nonetheless include one or more cameras in some implementations.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments and applications of the disclosure have been described herein, it will be apparent to those of ordinary skill in the art that many variations on the embodiments and applications described herein are possible without departing from the scope of this disclosure.

The invention claimed is:

1. A method of estimating locations of a moving sound source and audio device locations in an audio environment, the method comprising:

receiving, by a control system, sound source location control data from the moving sound source as the sound source emits sound in a plurality of sound source locations within the audio environment;

receiving, by the control system, direction of arrival data from each audio device of a plurality of audio devices placed in locations in the audio environment, each audio device of the plurality of audio devices including a microphone array, the direction of arrival data corresponding to microphone signals from microphone arrays responsive to sound emitted by the sound source in the plurality of sound source locations; and estimating, by the control system, locations of the sound source and audio device locations based, at least in part, on the location control data and the direction of arrival data.

2. The method of claim 1, further comprising controlling one or more aspects of audio processing for audio data played back by one or more audio devices of the plurality of audio devices based, at least in part, on the audio device locations.

3. The method of claim 2, wherein the one or more aspects of audio processing include rendering the audio data for playback, acoustic echo cancellation or a combination thereof.

4. The method of claim 1, further comprising:

receiving, by the control system, audio level data from one or more audio devices of the plurality of audio devices, the audio level data corresponding to the sound emitted by the sound source in the plurality of sound source locations; and estimating, by the control system, one or more audio device orientations based, at least in part, on the audio level data.

5. The method of claim 4, further comprising estimating, by the control system, an acoustic decay critical distance based, at least in part, on the audio level data.

6. The method of claim 1, further comprising providing, by the control system, sound source location instructions for the sound source.

7. The method of claim 6, wherein providing the sound source location instructions involves providing one or more user prompts for a user of the sound source.

8. The method of claim 6, wherein the sound source is an automated mobile sound source and wherein providing the sound source location instructions involves providing control signals to the automated mobile sound source.

9. The method of claim 1, wherein estimating the locations of the sound source and the audio device locations involves:

making a prediction of a state of a system that includes the sound source and the plurality of audio devices;

comparing the prediction with an observation of the system; and correcting the prediction based, at least in part, on the observation.

10. The method of claim 9, further comprising determining a weight for correcting the prediction based, at least in part, on the observation.

11. The method of claim 1, wherein estimating the locations of the sound source and the audio device locations involves implementing, by the control system, a Kalman filter.

12. The method of claim 11, wherein the Kalman filter is an extended Kalman filter or an Unscented Kalman filter.

13. The method of claim 1, wherein the estimating involves a recursive process.

14. The method of claim 1 wherein estimating the locations of the sound source and the audio device locations involves a non-causal process.

15. The method of claim 14, wherein estimating the locations of the sound source and the audio device locations involves implementing, by the control system, a Maximum Likelihood solver.

16. The method of claim 1, further comprising estimating, by the control system, one or more sound source kinematic properties based, at least in part, on the location control data.

17. The method of claim 1, wherein the location control data comprises inertial sensor data.

18. The method of claim 1, wherein estimating the locations of the sound source and audio device locations involves:

making a first estimation based on first location control data and first direction of arrival data obtained during a first time interval; and making a second estimation based on second location control data and second direction of arrival data obtained during a second time interval.

19. The method of claim 18, wherein the first time interval corresponds to an initial audio device setup.

20. The method of claim 18, wherein the second direction of arrival data corresponds to microphone signals responsive to human speech.

21. The method of claim 18, further comprising using estimated audio device locations from the first estimation as inputs for making the second estimation.

22. The method of claim 1, wherein a process of estimating the locations of the sound source and audio device locations occurs during a time interval in which location control data and direction of arrival data are being obtained.

23. The method of claim 1, wherein a process of estimating the locations of the sound source and audio device locations begins after a time interval in which location control data and direction of arrival data have been obtained.

24. One or more non-transitory media having software stored thereon, the software including instructions for controlling one or more devices to perform the method of claim 1.

25. An apparatus configured to estimate locations of a moving sound source and audio device locations in an audio environment, the apparatus comprising:

a first receiver for receiving, by a control system, sound source location control data from the moving sound source as the sound source emits sound in a plurality of sound source locations within the audio environment;

a second receiver for receiving, by the control system, direction of arrival data from each audio device of a plurality of audio devices placed in locations in the audio environment, each audio device of the plurality of audio devices including a microphone array, the direction of arrival data corresponding to microphone signals from microphone arrays responsive to sound emitted by the sound source in the plurality of sound source locations; and an estimator for estimating, by the control system, locations of the sound source and audio device locations based, at least in part, on the location control data and the direction of arrival data.

* * * * *